Patented July 25, 1944

2,354,593

UNITED STATES PATENT OFFICE 2,354,593

PLASTIC COMPOSITION

Harold W. Greider, Wyoming, and George A. Fasold, Mount Healthy, Ohio, assignors to The Philip Carey Manufacturing Company, a corporation of Ohio No Drawing. Application July 30, 1941, Serial No. 404,630

14 Claims. (Cl. 106—282)

This invention relates to plastic compositions containing a plastic binder material and a filler material.

It is a purpose of this invention to improve upon such compositions so that they may have improved properties both during the formative stages thereof and in products, articles, etc., composed of or containing such compositions. When reference is made herein to plastic binder material, this term is used generally as referring to such binder material either of the thermoplastic type or of the thermosetting type, and before or after it has been shaped by molding, coating or the like, and whether or not it has become set by cooling in the case of a thermoplastic or by application of heat in the case of a thermosetting plastic. The term "plastic composition" refers to any such plastic binder material in any of the conditions mentioned, which binder material has commingled therewith a finely-divided filler material.

It is a feature of this invention that there is used in conjunction with plastic binder material a substantial amount of special mineral filler material. The special mineral filler material is characterized in the first place by being definitely fibrous in character and in the second place by being within a limited range as to particle size. Preferably, the special fibrous mineral filler material is of graded particle sizes within the range of particle sizes having the special advantages of this invention.

Mineral fibrous materials which may be used in the practice of this invention may be mineral fibers such as asbestos or may be artificially-produced mineral fibers such as rock wool, slag wool, glass fibers or the like. Mineral fibers such as those referred to above are commonly produced so as to have considerable fiber length, which fiber length is regarded as of prime importance in producing such articles as insulation, paper, reinforced Portland cement and the like. Instead of using such fibers in their usual condition of considerable length, we have found that mineral fibers in a much shorter condition but which are not, on the other hand, excessively minute, have marked utility and advantages in connection with the plastic compositions. Heretofore, such very short fibers have been regarded as a useless byproduct or waste material which, so far as we are aware, have not heretofore found any useful application. We have found, however, that such materials have distinct utility and result in decided advantages when used in products of the character herein described.

As an example of a fibrous mineral filler suitable for use in the practice of this invention, reference may be made to the dust-like asbestos which is a by-product of the asbestos milling industry. A typical grade of this asbestos dust-like material is that which results as a by-product of the milling of asbestos rock for the recovery of asbestos fiber of ordinary commercial lengths, by the Quebec Asbestos Corp. of East Broughton, P. Q., Canada. The asbestos dust by-product referred to is of such finely-divided character that all will pass a 20-mesh standard testing sieve, about 85% by weight will pass a 48-mesh testing sieve, about 65% by weight will pass a 100-mesh testing sieve, about 50% will pass a 200-mesh testing sieve, and about 35% will pass a 325-mesh testing sieve. This material has heretofore had no commercial use and has been regarded as worthless waste. For purposes of brevity, the particular material described by way of exemplification will be referred to as "waste asbestos" or "asbestiform waste." The particle size range and gradation of particle size in this material are especially suitable for use in the practice of this invention.

The plastic binder material that may be used in conjunction with the special mineral fiber filler may be of the thermo-setting type or of the thermoplastic type. The use of the special fibrous mineral filler in conjunction with thermoplastic binder materials is of especial advantage in the practice of this invention.

One of the plastic materials with which the special filler material may be employed according to this invention is bituminous material in the nature of asphalt, tar, pitch or the like. Thus, for example, when waste asbestos of the character above mentioned is used with bituminous binder material, bituminous plastic composition can be provided having unique and highly useful properties. In the mixing and forming of the plastic composition, the special properties of the asbestos waste enable relatively large amounts of the filler to be incorporated while still retaining workability of the mass. While the mass remains workable, it has the property of retaining its shape unless subjected to mechanical force tending to deform the mass. Thus, for example, if about 30 to 50% by weight of waste asbestos is mixed with an asphalt having a softening point of about 200° to 300° F., a mass can be formed which can be spread or molded or otherwise shaped, but even at very high temperatures tends to retain its shape. That the mass tends to retain shape is due to the capacity of the specially sized mineral fiber to form a skeletal structure which, once formed, tends to retain its shape regardless of the temperature of the surrounding thermoplastic material. This is advantageous during the molding of the articles and is likewise highly advantageous in resistance to fire when a combustible thermoplastic material like bitumen is employed. When the material is heated to or adjacent flame temperatures, the formed article tends to retain its shape without excessive flowing and also tends to retain the bitumen therein without bleeding, so that the tendency of the bitumen to burn is very greatly reduced. The result is that the formed article, if exposed to flame, will resist burning and flowing of hot bitumen and will merely char to a tough coherent ash that has very good heat-insulating properties. As soon as direct flame is removed from the article, the charring promptly stops. Moreover, during flame application, there is very high resistance to spread of flame.

The new product also has improved stability at elevated temperatures that are lower than flame temperatures. Thus, it is well known that many bituminous binders soften and are readily deformed if only mildly heated. The special fiber, e. g. waste asbestos, greatly decreases the tendency of the bitumen to soften and greatly increases the temperature range in which plastic bituminous compositions may be utilized without excessive deformation. This is due to the special size of mineral particles, namely, they are sufficiently small to elevate substantially the softening point of bitumen and yet are sufficiently large to permit the fibers to build up a stable skeletal structure in the composition. The bituminous composition is also of high resistance to weather exposure and to action of chemicals.

The bituminous plastic composition containing the specially sized mineral fiber filler is also advantageous inasmuch as it can be brought to desired shape by molding, spreading or the like with the production of smooth surfaces having desired shapes and dimensions.

In the molded article, the dense skeletal structure provided by the special size mineral fiber provides good mechanical properties, namely, great toughness and tensile strength without brittleness.

The type of products that can be manufactured according to this invention are various. Referring to bituminous products, different types of products can be made depending primarily upon the amount of special size mineral fiber that is employed. Thus, if asphalt having a penetration of about 3 to 5 at 77° F. and a softening point of about 170° to 220° F. is used to the extent of about 20% to 40% by weight, together with about 30% to 50% by weight of asbestos waste of the particle size range above described, the balance of the product being sand or other fine granular mineral, tile-like bodies can be produced which are very tough and very resistant to wear and deformation. Moreover, the product is very highly fire-resistant and can be used to provide a very fire-resistant floor or pavement. Moreover, tile-like bodies can be made which are very hard and which at the same time are not as brittle as bituminous tiles heretofore made. Moreover, the tiles remain hard and resistant to deformation at elevated temperatures and are superior to tiles heretofore made in this regard. In this connection, it may be mentioned that pavements exposed to the sun may become heated to temperatures of about 170° F. at which ordinary bituminous tile and planks heretofore made become excessively softened. Tile-like bodies of the character referred to can be made by working the materials at elevated temperature and extruding the mass while hot, or by any other suitable forming operation.

If desired, the bitumen in the tile-like bodies above described may be replaced by some other thermoplastic binder such as cumarone-type resin. If, for example, about 20 to 40% by weight of plastic binder material is used (which binder material contains about 50 to 90% by weight of a suitable grade of "Cumar" resin and about 50 to 10% by weight of bitumen), together with about 20 to 50% by weight of the specially sized mineral fiber; and together with pigment (and, if desired, some other filler such as fine sand), ornamental tiles can be made that have great toughness and very high resistance to fire and to deformation at elevated temperatures. Moreover, the fine particle size of the fiber facilitates the forming operations and enables the production of tiles or the like having smooth and accurately dimensioned surfaces.

Using a bituminous plastic composition of the character above described, conduits for electrical wires and cable can be manufactured with the advantages above mentioned. Moreover, the resulting product is very tough (without being brittle) and is very high resistant to fire and to deformation at elevated temperatures.

If a somewhat greater proportion of bitumen binder is used in relation to the amount of filler, plastic compositions can be prepared according to this invention which are readily spreadable. For example, by employing about 50 to 75% by weight of bitumen having a softening point of about 200 to 300° F., together with about 25 to 50% by weight of asbestos waste, a spreadable plastic material is afforded which can be used for a variety of purposes. For example, such a material can be used for coating pipes, e. g., pipes of the type used for transmission of oil or natural gas. Pipes of this character may be coated with the plastic composition either at the factory or on the job. In conjunction with the plastic composition, the pipe may be wrapped with felt and additional layers of the plastic composition may be applied to the felt. The composition of the present invention is desirable because, notwithstanding the presence of a large amount of filler material, the mass is readily workable and spreadable so that a uniform coating is produced wherein the specially sized fiber is distributed uniformly both in amount and orientation. While the material may be easily spread at high temperature, it has the capacity of remaining in place and of not sliding off the pipe so as to result in a coating of non-uniform thickness. This characteristic of the coating composition is due to the capacity of the specially sized mineral fiber to form a dense skeletal structure within the coating. The pipe coating bitumens that are generally used at the present time are special pitches, tars, etc. The use of the specially sized mineral fibers permits the use of a wider variety of bitumens in pipe coatings. Even when the best of the prior art bituminous coating materials are used, there is a tendency for pinholes to form in the coating material that permit water or corrosive chemicals to contact the pipe. This is especially true when hot bitumen such as pitch, tar, asphalt or the like is applied to the felt while cold, since the hot bitumen tends to drive off moisture and gases leaving minute openings in the coating. When the especially sized mineral fiber is used, the coating is stronger at the elevated temperatures at which the coating is applied and this property of the coating material results in the prevention of pinholes for the reason that the pressure exerted by the gases or vapors is not sufficient to deform and penetrate through the coating material. This same property makes the coating material more resistant to dampness under summer sun conditions. The presence of the specially sized mineral fiber also makes the coating more impervious to penetration by moisture and more resistant to chemicals such as acids and alkalis. The coating is also very tough and resistant to abrasion and has very high tensile strength. It is also important that the special plastic composition has extremely high fire resistance. Inasmuch as oil pipes, gas pipes, etc., are used in handling highly inflammable material, fire resistance is highly important. The material not only is highly resistant to combustion but also, when exposed to flame temperature, remains in place as a heat insulating covering. The specially sized fiber, being resistant to flow, causes the coating to resist displacement and flowing at high temperatures and results in a skeletal mat having high heat insulation properties when the coating is subjected to flame temperatures.

A plastic coating composition such as that above described in connection with the coating of oil pipes can also be used for the coating of electric wires and cables. Wire either with or without a suitable braiding can be passed through a coater and receive a coating of the character above described. In lieu of straight bitumen plastic containing asbestos waste or the like, other plastic materials such as stearine pitch, wax and the like may be used in admixture with the bitumen. The resulting wire product when thus coated with the special coating composition has a highly weather-resistant insulating coating which is tough and resistant to abrasion and which is highly resistant to burning and to transmission of combustion. Heretofore, many efforts have been made to provide highly fire-resistant coatings for wires which have other required characteristics as well. The use of the specially sized fiber as a filler enables these difficulties to be overcome and a better product to be produced. The special plastic composition is also advantageous in that when uhed as a coating for a flexible material such as wire, it enables a coating to be applied which is resistant to abrasion and deformation and at the same time is pliable at normal temperature, thereby permitting flexure of the wire without rupturing the coating. These combined properties are due to the special size of the mineral fiber filler material and are of distinct advantage and utility.

The coating material also can be used for various other purposes; for example, a b'tuminous coating including about 30 to 50% of the specially sized mineral fiber can be used to coat sheet material, e. g., sheets of paper. The resulting paper is highly res'stant to moisture penetration and is also highly resistant to deterioration due to weathering. The paper is likewise highly fire-resistant. Any combustibility of the paper backing is counteracted by the non-combustibility of the coating. The coated paper makes an excellent wrapping for munitions and other things that it is desirable to protect both from moisture and from fire by a durable, tough, pliable sheet material. By way of specific illustration, a coating containing the special filler may be applied so as to be about 10 to 20 pounds per 100 square feet. Instead of paper, other sheet materials such as woven fabrics or fabrics made of unspun bonded fibers may be used. Materials such as these are also useful as a moisture barrier for mineral wool insulating bats and for other purposes. For coating paper, fabrics, etc. the special coating composition is advantageous in that it is tough and resistant to abrasion and at the same time can be made so as to be very flexible without rupturing.

The coating material can also be applied to such materials as fiber boards, wall boards, or the like to protect them from moisture and from fire.

In addition to bituminous plastic materials, the specially sized mineral fiber may be used with other plastic binder materials both naturally occurring and synthetic. Thus a filler such as the asbestos waste above referred to may be mixed with thermoplastic binders of the vinyl type. For example, the special filler material when mixed with vinyl acetate-vinyl chloride copolymer can be used to afford a tough and fire-resistant coating for sheet materials of metal or fibers and for wall boards. When mixed with polyvinyl chloride, the composition is useful for cable coverings, tank linings, etc. and affords improved toughness, resistance to chemicals, water, etc., while at the same time being pliable and not excessively brittle. Floor tiles similar to those above described using bitumen as a b'nder may be made, using vinyl resin as a binder and have the numerous advantages that are pointed out above. Moreover, since the special filler is very finely divided, vinyl plastic compositions containing asbestos waste or the equivalent can be made up in powder or granular form for compression or injection molding.

Lignin plastic materials made by treating lignin with phenols, aldehydes, amines, etc., can be made which are of the thermoplastic type and of the thermosetting type. Such plastic materials can be improved as to toughness, fire-resistance, temperature stability, etc., by the special size mineral fibers according to this invention. Such materials may be used for panelling, auto parts, etc., and can be produced in sheets, blocks, coatings and the like.

With plastic binder material such as coumarone-indene resins, thermoplastic products of high chemical resistance can be made and can be improved in toughness, fire resistance, temperature stability, etc., by the specially-sized mineral fibers. The resulting products can be used in coatings, tile-like bodies, etc., for example.

The strength, toughness, dimensional stability and fire-resistance of phenol-aldehyde or phenol-urea resins can be improved by the use of the specially-sized mineral fibers. Such materials can be made in usual ways and used for auto parts, electrical insulations, housings and the like, for example, and can be made very resistant to moisture and chemical action.

Other plastics of either the thermoplastic or the thermosetting type can also be used as the plastic binder material such as cellulose esters and ethers, casein plastics, styrene plastics, acrylic resin plastics, alkyd resins and also natural resins and gums. Such materials can be formed from the material in liquid state or by molding plastic compositions in powdered or granular form.

If a material such as asbestos waste is used which is substantially free of impurities in a transparent plastic material having a similar index of refraction, the resulting body will be transparent. It is therefore possible to achieve the advantages of toughness, temperature stability, fire-resistance, strength, resistance to weather, etc. according to this invention in transparent products. In this connection, the index of refraction of chrysotile asbestos usually is about 1.49 to 1.57.

As to the specially sized mineral fiber, that which is effective according to this invention is of such finely divided character that it will pass a 20-mesh standard testing sieve. At the other extreme, the finely-divided fiber should not be excessively minute. For example, if all of the material were to be reduced to an extremely fine powder passing a 325-mesh testing sieve, the individual particles would be so fine that a coherent skeletal structure would not be formed within the molded material. However, if finely-divided fibers that pass a 20-mesh sieve and are retained on a 325-mesh sieve are mixed with some material passing a 325-mesh sieve, the very fine material passing the 325-mesh sieve when in combination with the slightly larger fibers has a useful effect. Therefore, according to this invention, the specially sized mineral fiber should pass a 20-mesh testing sieve and at least 50% by weight thereof should be retained on a 325-mesh testing sieve. Preferably, the fibers should contain at least about 60% by weight of material passing a 65-mesh testing sieve and preferably should be graded so that at least about 20% by weight will be retained on a 100-mesh testing sieve and at least 20% by weight will pass a 100-mesh testing sieve.

Of the fibrous mineral materials that may be used, chrysotile asbestos of the fiber size above indicated is very satisfactory. Other asbestiform mineral fibers also are suitable, e. g., Canadian picrolite, crocidolite, amosite, anthophyllite, tremolite, and actinolite. Of these materials, chrysotile asbestos and Canadian picrolite have the property when heated to or adjacent flame temperatures of liberating water of constitution which tends to develop pores especially in thermoplastic binder materials and thereby expand the material, giving greater heat insulating properties. This is highly advantageous for many applications of this invention. Other asbestiform mineral fibers contain very low liberatable water of constitution and do not have this property. Such other asbestiform mineral fibers may be employed if the development of pores in the plastic composition at flame temperatures is not desired.

In addition to asbestiform mineral fibers, other mineral fibers such as rock wool, slag wool and glass fiber may also be used if of the special reduced particle size above mentioned. If necessary, ordinary rock wool, slag wool or glass fiber may be ground down to the required particle size, although in connection with the manufacture of these materials there is a considerable amount of waste and refuse that may be turned to a useful purpose by the practice of this invention. Such mineral fibers do not contain water of constitution that is liberatable at or adjacent flame temperatures.

The amount of the special mineral fiber filler that is used depends largely upon the nature of the product to be manufactured. Thus, for plastics applied by a coating operation considerably less of the filler is used than in a product that is produced by compression molding or by extrusion. In order to get the benefits of the present invention, the special mineral fiber filler should constitute at least about 20% by weight of the plastic composition as a whole. Usually for plastic compositions applied by a coating operation, it is desirable to employ about 30% to about 50% by weight of the specially sized mineral fiber in the plastic composition. At the other extreme for certain types of molding, the special mineral fiber filler may constitute 75 or 80% by weight of the composition.

It is not necessary that special fibrous mineral filler be the only filler that is employed. Thus, in the manufacture of tiles or the like fillers in the nature of fine sand, slate flour, kaolin clay, pigment, etc., may also be present. For preferred results, however, it is preferable that a major proportion of the filler in the plastic composition be the specially sized mineral fiber.

The amount of plastic binder material that is present in the composition also depends largely upon the use to which the composition is to be put. When the composition is to be used in a coating operation, it is desirable that about 45% by weight and preferably about 50% by weight of the composition be in the form of binder material. For other types of molded or extruded articles, the binder may be reduced to about 20% by weight of the composition, but preferably is at least about 30% by weight of the composition. The upper ranges of plastic binder material that should be present are, of course, dependent upon the minimum amounts of special and other types of filler that should be present and that have been mentioned hereinabove.

In the usual case, the composition will contain about 20% to about 70% by weight of plastic binder material and preferably contains about 30 to 60% by weight of the plastic binder material. The composition usually contains about 20 to 60% by weight of the special mineral fiber and preferably contains about 30 to 50% by weight of the special mineral fiber.

The resistance to fire of the plastic compositions containing the special size mineral fibers has been pointed out above and is due to the capacity of the special size mineral fibers to form a non-combustible skeletal mass that remains in place and tends to retain a plastic binder therein. By prevention of flow, spread of flame is prevented and by retention of plastic binder within the non-combustible skeletal structure, combustion is greatly retarded so that the mass, under exposure to flame, chars gradually while remaining in place to form a substantial mat-like mass that is highly effective as a heat insulation for any underlying material.

While a certain amount of resistance to combustion can be achieved by utilizing large amounts of other non-combustible filler materials, this detracts from the toughness of plastic compositions thus compounded, and renders products made from such compositions excessively brittle. By utilization of the special size mineral fiber, one can achieve higher fire-resistance using a lesser amount of filler due to the tendency of the fiber to build up an internal skeletal structure. Moreover, high fire-resistance can be achieved without sacrifice of toughness and resistance to impact. In fact, the special size mineral fiber tends to materially increase the toughness of the product. So far as we are aware, no plastic composition heretofore has been made having the high fire-resistance combined with the high toughness of products that can readily be produced according to this invention.

The special size mineral fiber filler is also of great advantage in imparting to plastic compositions containing same greater resistance to heat at elevated temperatures lower than flame temperatures. This is particularly the case in connection with thermo-plastic binders which tend to soften when heated. The special size mineral fiber filler has a pronounced effect in increasing viscosity of thermoplastic binders with which it is mixed. Thus, for example, there are many thermoplastic materials which soften excessively when heated to temperatures such as 170 to 200° F. and become soft so that they are readily distorted and may even become deformed under their own weight. If the special size mineral filler is used in such compositions, the composition retains much greater toughness and resistance to deformation at elevated temperature and much greater capacity to retain desired dimensions. Put in another way, the use in plastic compositions of the special size mineral fiber filler markedly increases the temperature range in which given binder materials can be used in making plastic products. This effect in greatly increasing the viscosity and toughness of plastic compositions at elevated temperatures is due to the special size of the mineral particles. From one point of view, they are not sufficiently minute to destroy the fibrous character thereof which enables a coherent skeletal structure to be built up within the composition and from another point of view they are sufficiently small so that there is a specific surface effect which raises substantially the softening point and viscosity of the plastic composition. Thus, by utilizing mineral fiber filler within the special size range above mentioned in plastic compositions, there is a very pronounced increase in toughness and strength at elevated temperatures lower than flame temperatures, and generally improved temperature stability.

As to plastic binders of the thermosetting type, the special size mineral fiber filler, due to its inherent resistance to decomposition at elevated temperatures, permits molding and setting at higher temperatures, as compared with the use of organic filler, thereby permitting more rapid molding and the use of plastic binders which require employment of very high setting temperatures.

The use of the special size mineral fibers also increases the resistance to disintegration at elevated temperatures of the compositions containing same due to the inherent resistance of the mineral material. Thus, many organic materials, even at temperatures as low as 175 to 200° F. tend to gradually disintegrate with resultant impairment of the utility of a plastic product. This disadvantage can be largely overcome according to this invention.

The special size mineral fiber filler is also advantageous as compared with organic fillers because of the fact that it increases the resistance of plastic compositions to the action of water and weathering. Organic fillers, even when embodied in a plastic binder material tend to hydrate and swell when exposed to moisture, causing an article containing such filler to swell and warp. Moreover, if the exposure is prolonged, the organic filler material deteriorates with resultant deterioration of a product containing such filler material. Such difficulties may be avoided in the practice of this invention and this is of considerable commercial importance inasmuch as articles of various types may, either intentionally or unintentionally, become exposed to moisture. The special mineral filler also enables plastic compositions to be made which are more resistant to chemicals such as acids, alkalis, salts and the like as compared with plastic compositions containing organic filler materials.

This invention is also of advantage in that products containing a plastic binder can be produced which have a high degree of hardness without sacrifice of toughness. If large amounts of pulverulent filler material are used a product can be produced which is hard, but when the material is compounded so as to be very hard the product at the same time is excessively brittle. According to the present invention products can readily be produced using either thermoplastic or thermosetting plastic binders, which products are very hard and which products at the same time are very tough and resistant to shock. Here again, particle size of the especially sized filler is important, namely, the particles are sufficiently small so that plastic compositions can be consolidated to produce very hard products and are nevertheless of fibrous structure that imparts a high degree of toughness and strength to products prepared according to this invention.

The capacity of the specially sized mineral fiber filler to increase resistance to elevated temperatures, moisture, chemicals, etc., while at the same time not sacrificing toughness and even while markedly increasing the toughness of plastic compositions and products, is also of utility where one of the requirements of a product is good pliability. Pliability is important in connection with sheet materials, coatings and the like. It is one of the advantages of this invention that plastic products can be produced having high pliability. Thus, articles such as paper or other sheet materials can be produced with an adherent layer of plastic composition which is capable of flexure without rupturing the coating. The same is true of such articles such as wires, cables, etc., which carry a coating of plastic composition.

It is believed to be apparent from the foregoing that products and articles can be produced using the special size mineral fiber filler materials above defined which products and articles have numerous advantages and features of utility as compared with prior art plastic compositions. Moreover, these advantages and features may be embodied in a wide variety of compositions and products, a number of typical examples thereof having been mentioned hereinabove.

While this invention has been described in connection with certain examples of the practice thereof, it is to be understood that this has been done for illustrative purposes and that the scope of this invention is to be governed by the language of the following claims construed in the light of the foregoing description.

We claim:

1. A plastic composition which comprises a plastic binder material and distributed in said binder material at least about 20% by weight of mineral fiber filler which passes a 20 mesh testing sieve and a major proportion of which is retained on a 325 mesh testing sieve and which is graded in size, at least 20% by weight of said mineral fiber being retained on a 100 mesh testing sieve and at least 20% by weight of said mineral fiber passing a 100 mesh testing sieve.

2. A plastic composition according to claim 1 wherein said plastic binder material is a thermoplastic binder material.

3. A plastic composition which comprises a plastic binder material and distributed in said binder material at least about 20% by weight of mineral fiber filler which passes a 20 mesh testing sieve, over 60% by weight of which passes a 65 mesh testing sieve, at least 20% by weight of which is retained on a 100 mesh testing sieve, and a major proportion by weight of which is retained on a 325 mesh testing sieve.

4. A plastic composition which contains about 30% to 60% by weight of plastic binder material and about 30% to about 50% by weight of mineral fiber which passes a 20 mesh testing sieve and a major proportion of which is retained on a 325 mesh testing sieve and which is graded in size, over 60% by weight passing a 65 mesh testing sieve, at least 20% by weight being retained on a 100 mesh testing sieve, and at least 20% by weight passing a 100 mesh testing sieve.

5. A plastic composition which comprises about 20 to 60% by weight of a plastic binder material and comprising distributed uniformly through said binder material about 20 to 70% by weight of mineral fiber filler passing a 20 mesh sieve and a major proportion by weight of which is retained on a 325 mesh sieve and which is graded in size, over 60% by weight passing a 65 mesh testing sieve, at least 20% by weight being retained on a 100 mesh testing sieve, and at least 20% by weight passing a 100 mesh testing sieve.

6. As a coating composition, a composition containing at least about 40% by weight of thermoplastic binder material and at least 30 to 50% by weight of a mineral fiber filler which passes a 20 mesh testing sieve and a major proportion by weight of which is retained on a 325 mesh sieve and which is graded in size, over 60% by weight passing a 65 mesh testing sieve, at least 20% by weight being retained on a 100 mesh testing sieve, and at least 20% by weight passing a 100 mesh testing sieve.

7. A plastic composition which comprises at least about 20% by weight of a bituminous binder and at least about 20% by weight of mineral fiber filler which passes a 20 mesh testing sieve and a major proportion by weight of which is retained on a 325 mesh testing sieve and which is graded in size, over 60% by weight passing a 65 mesh testing sieve, at least 20% by weight being retained on a 100 mesh testing sieve, and at least 20% by weight passing a 100 mesh testing sieve.

8 A plastic coating composition which comprises at least about 45% by weight of bituminous binder and a least about 30% by weight of mineral fiber filler which passes a 20 mesh testing sieve and a major proportion by weight of which is retained on a 325 mesh sieve and which is graded in size, over 60% by weight passing a 65 mesh testing sieve, at least 20% by weight being retained on a 100 mesh testing sieve, and at least 20% by weight passing a 100 mesh testing sieve.

9. An article comprising a sheet base and a water and fire resistant coating for said sheet base comprising at least about 45% by weight of a bituminous binder and at least about 30% by weight of mineral fiber filler which passes a 20 mesh sieve and a major proportion of which is retained on a 325 mesh testing sieve and which is graded in size, over 60% by weight passing a 65 mesh testing sieve, at least 20% by weight being retained on a 100 mesh testing sieve, and at least 20% by weight passing a 100 mesh testing sieve.

10. An article according to claim 9 wherein said bitumen has a softening point of about 200 to 300° F. and wherein the fiber of said mineral fiber filler is asbestiform mineral fiber.

11. A plastic composition which comprises a plastic binder material and distributed in said binder material at least about 20% by weight of asbestiform mineral fiber which passes a 20 mesh testing sieve and a major proportion by weight of which is retained on a 325 mesh testing sieve and which is graded in size, over 60% by weight passing a 65 mesh testing sieve, at least 20% by weight being retained on a 100 mesh testing sieve, and at least 20% by weight passing a 100 mesh testing sieve.

12. A plastic composition which contains at least about 20% by weight of plastic binder material and distributed in said binder material at least about 20% by weight of asbestiform mineral fiber which passes a 20 mesh testing sieve, said asbestiform mineral fiber being of such particle size that about 85% by weight will pass a 48 mesh testing sieve, about 65% by weight will pass a 100 mesh testing sieve, about 50% by weight will pass a 200 mesh testing sieve, and about 35% will pass a 325 mesh testing sieve.

13. A plastic composition which comprises at least 20% by weight of a plastic binder material and distributed in said binder material at least about 20% by weight of a mineral fiber filler which passes a 20 mesh testing sieve, about 20% by weight of which passes a 100 mesh testing sieve, about 20% by weight of which is retained on a 100 mesh testing sieve, and a major proportion by weight of which is retained on a 325 mesh testing sieve.

14. A formed article comprising at least about 20% by weight of a plastic binder material and at least about 20% by weight of mineral fiber filler which passes a 20 mesh testing sieve and a major proportion by weight of which is retained on a 325 mesh sieve and which is graded in size, over 60% by weight passing a 65 mesh testing sieve, at least 20% by weight being retained on a 100 mesh testing sieve, and at least 20% by weight passing a 100 mesh testing sieve.

HAROLD W. GREIDER.
GEORGE A. FASOLD.